US010838395B2

(12) United States Patent
Hada et al.

(10) Patent No.: US 10,838,395 B2
(45) Date of Patent: Nov. 17, 2020

(54) INFORMATION PROCESSING DEVICE

(71) Applicant: FANUC CORPORATION, Minamitsuru (JP)

(72) Inventors: Hiroaki Hada, Yamanashi (JP); Shinichirou Itakura, Yamanashi (JP); Kouji Satou, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 78 days.

(21) Appl. No.: 16/202,897

(22) Filed: Nov. 28, 2018

(65) Prior Publication Data
US 2019/0163166 A1 May 30, 2019

(30) Foreign Application Priority Data

Nov. 30, 2017 (JP) .................................. 2017-229811

(51) Int. Cl.
*G05B 19/4069* (2006.01)
*G05B 19/4061* (2006.01)
*G05B 19/4097* (2006.01)

(52) U.S. Cl.
CPC ..... *G05B 19/4069* (2013.01); *G05B 19/4061* (2013.01); *G05B 19/4097* (2013.01); *G05B 2219/23456* (2013.01)

(58) Field of Classification Search
None
See application file for complete search history.

(56) References Cited

U.S. PATENT DOCUMENTS

| 5,590,268 A * | 12/1996 | Doi | G06F 30/20 |
| | | | 715/848 |
| 6,452,604 B1 * | 9/2002 | Sato | G06T 17/00 |
| | | | 345/619 |
| 7,899,574 B2 * | 3/2011 | Ogawa | G05B 19/4069 |
| | | | 700/159 |

(Continued)

FOREIGN PATENT DOCUMENTS

| JP | 08263116 A | 10/1996 |
| JP | 2007-018145 A | 1/2007 |

(Continued)

OTHER PUBLICATIONS

Japanese Notice of Reasons for Refusal for Japanese Application No. 2017-229811, dated Nov. 12, 2019 with translation, 6 pages.

*Primary Examiner* — Ramesh B Patel
(74) *Attorney, Agent, or Firm* — RatnerPrestia

(57) ABSTRACT

An information processing device controls operation trouble or a calculation amount related to a machine interference check by automatically creating a three-dimensional model optimal for the machine interference check. The information processing device optimizes, for the interference check, three-dimensional model data of a machine including a plurality of structures. The information processing device includes a check object selection unit that performs selection among the structures, and a model creating unit that creates three-dimensional model data for an interference check which data includes the selected structure. Since the information processing device can generate three-dimensional model data optimized for an interference check, there is no trouble for a user to create new three-dimensional model data by himself/herself, and a simple and effective interference check can be realized.

5 Claims, 3 Drawing Sheets

(56) References Cited

U.S. PATENT DOCUMENTS

| | | | | |
|---|---|---|---|---|
| 9,122,267 | B2* | 9/2015 | Morita | G05B 19/4061 |
| 9,651,938 | B2* | 5/2017 | Mitsuhashi | G05B 19/4061 |
| 9,791,848 | B2* | 10/2017 | Tanaka | G06T 19/20 |
| 10,296,697 | B2* | 5/2019 | Kasai | G06F 30/30 |
| 10,444,728 | B2* | 10/2019 | Ito | G05B 19/29 |
| 2001/0029440 | A1* | 10/2001 | Kondo | G06T 17/20 |
| | | | | 703/2 |
| 2002/0026295 | A1* | 2/2002 | Sato | G06T 19/20 |
| | | | | 703/1 |
| 2005/0283270 | A1* | 12/2005 | Nakamura | G05B 19/4069 |
| | | | | 700/178 |
| 2007/0185692 | A1* | 8/2007 | Okuwaki | G06F 30/00 |
| | | | | 703/1 |
| 2008/0076274 | A1* | 3/2008 | Okuwaki | H05K 1/00 |
| | | | | 439/65 |
| 2009/0138243 | A1* | 5/2009 | Tokumaru | G06F 30/00 |
| | | | | 703/1 |
| 2011/0106291 | A1* | 5/2011 | Matsumoto | B23Q 39/027 |
| | | | | 700/178 |
| 2015/0091898 | A1* | 4/2015 | Tanaka | G06F 30/00 |
| | | | | 345/419 |
| 2018/0272535 | A1* | 9/2018 | Ogawa | B25J 5/007 |
| 2019/0039242 | A1* | 2/2019 | Fujii | G05B 19/19 |

FOREIGN PATENT DOCUMENTS

| | | |
|---|---|---|
| JP | 2008071015 A | 3/2008 |
| JP | 2008234295 A | 10/2008 |
| JP | 2015069526 A | 4/2015 |

\* cited by examiner

INFORMATION PROCESSING DEVICE

CROSS-REFERENCE TO RELATED APPLICATION

This application is a new U.S. Patent Application that claims benefit of Japanese Patent Application No. 2017-229811, filed Nov. 30, 2017 the disclosure of this application is being incorporated herein by reference in its entirety for all for all purposes.

BACKGROUND OF THE INVENTION

1. Field of the Invention

An embodiment of the present invention relates to an information processing device and specifically relates to an information processing device that can control operation trouble or a calculation amount related to a machine interference check by automatically creating a three-dimensional model optimal for the machine interference check.

2. Description of the Related Art

Since structures including a tool, work, and table are relatively moved in a case where the work is processed by a machine tool or the like controlled by a numerical controller, there is a case where the structures interfere with each other. As a function to execute a check of such interference in real time, that is, while progressing processing, there is a three-dimensional interference check function. According to the three-dimensional interference check function, the numerical controller can execute an interference check between structures with a three-dimensional model while predicting a processing program, that is, before processing.

Note that the numerical controller that executes the three-dimensional interference check needs to hold a three-dimensional model of a structure in advance. Since many machine tool manufacturers use 3D CAD in designing of a machine tool, diverting three-dimensional model data of the machine tool, which data is created at the time, to the three-dimensional interference check is useful.

In Japanese Patent Application Laid-Open No. 2007-018145, a technology of changing accuracy of interference check (more specifically, shape of interference determination region, or the like) according to a moving speed of a movable unit, or the like in a numerical controller that executes three-dimensional interference check is disclosed. Accordingly, it is possible to control a processing load, which is generated by interference check, in some degree according to a processing condition.

In related art including Japanese Patent Application Laid-Open No. 2007-018145, all structures related to processing become objects of an interference check. For example, a machine tool includes a great number of structures such as components. Three-dimensional model data diverted from design data also includes three-dimensional model data of these structures. Although these structures include those that do not interfere with each other, all such structures are also objects of an interference check. That is, unnecessary processing is performed in the interference check.

However, no technology of eliminating such structures that do not essentially require an interference check from objects of the interference check has been provided. Note that when three-dimensional model data is created from scratch specifically for an interference check without diverting of design data, there is a possibility that unnecessary processing in interference check processing can be controlled in some degree. However, it is troublesome to create three-dimensional model data specifically for an interference check from scratch. Also, it becomes necessary to doubly manage design data and data for an interference check. Thus, there is a problem that a cost is rather increased.

SUMMARY OF THE INVENTION

The present invention is provided to solve such a problem and is to provide an information processing device that can control operation trouble or a calculation amount related to a machine interference check by creating a three-dimensional model optimal for the machine interference check.

An information processing device according to an embodiment of the present invention is an information processing device that optimizes, for an interference check, three-dimensional model data of a machine including a plurality of structures, the device including: a check object selection unit that performs selection among the structures; and a model creating unit that creates three-dimensional model data for the interference check which data includes the selected structure.

According to an embodiment of the present invention, it is possible to provide an information processing device that can control operation trouble or a calculation amount related to a machine interference check by creating a three-dimensional model optimal for the machine interference check.

BRIEF DESCRIPTION OF THE DRAWINGS

The above-described object and characteristic and a different object and characteristic of the present invention will become obvious from a description of embodiments in the following with reference to the attached drawings. Among these drawings.

DETAILED DESCRIPTION OF THE PREFERRED EMBODIMENTS

An information processing device 100 according to a first embodiment of the present invention generates three-dimensional model data, which is optimized for an interference check, on the basis of three-dimensional model data for designing of a machine tool or the like. Accordingly, it is possible to reduce a load of interference check processing.

The information processing device 100 is typically a numerical controller but is not limited thereto. For example, the information processing device 100 may be a personal computer (PC) connected to a numerical controller, a PC that can execute a three-dimensional interference check function, a PC that can create or process three-dimensional model data for designing of a machine tool or the like, a server computer connected to any of these PCs in a communicable manner, or the like.

Figure 1:
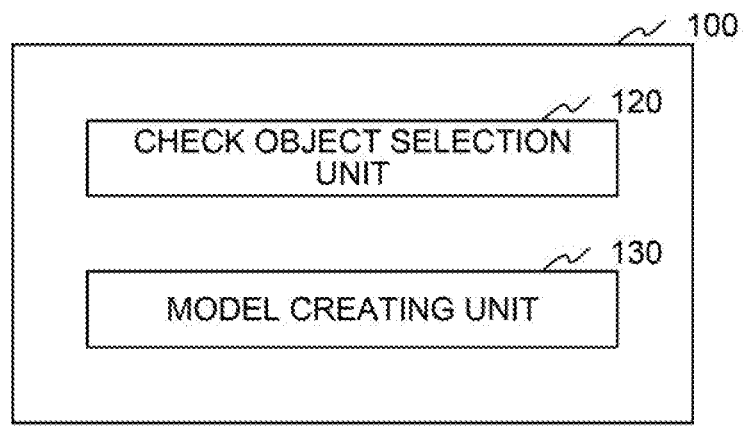
FIG. 1 is a block diagram illustrating a configuration of an information processing device according to a first embodiment.

FIG. 1 is a block diagram illustrating a functional configuration of the information processing device 100. The information processing device 100 includes a check object selection unit 120 and a model creating unit 130. The information processing device 100 includes a central processing unit (CPU), a storage device, an input/output device, and the like. The processing unit is logically realized by execution of a program, which is stored in the storage device, by the CPU.

The check object selection unit 120 extracts, from all structures of a machine tool or the like, a structure that may interfere with a movable unit, that is, an axis and a structure that operates along with the axis of the machine tool or the like. For example, the check object selection unit 120 displays all structures of a machine tool or the like onto a display device (operation screen of user) (not illustrated) and extracts, as a structure that may interfere with a movable unit of the machine tool or the like, a structure selected by a user with operation on an input device such as a mouse, keyboard, or touch panel (not illustrated).

The model creating unit 130 creates three-dimensional model data only including a structure selected by the check object selection unit 120. In other words, new three-dimensional model data specifically for interference check processing which data includes, as an element, three-dimensional model data of the structure extracted by the check object selection unit 120 is created.

The three-dimensional model data specifically for interference check processing which data is created by the model creating unit 130 may be used for known interference check processing. In related art, three-dimensional model data used in interference check processing includes a great number of structures created in designing of a machine tool or the like. On the other hand, three-dimensional model data specifically for interference check processing which data is created in the present embodiment only includes a structure other than a structure selected by a user, that is, a structure determined by the user that interference with a different structure may be generated. When this three-dimensional model data is used for an interference check, a structure that does not cause interference is eliminated from an object of the interference check and unnecessary processing in related art is not generated.

Next, an information processing device according to a second embodiment of the present invention will be described. An information processing device 100 according to the present embodiment manually or automatically generates three-dimensional model data, which is optimized for an interference check, on the basis of three-dimensional model data for designing of a machine tool or the like and information such as an axis travel range held by the information processing device 100 in advance. Accordingly, it is possible to reduce time and effort in generation of a three-dimensional model for an interference check and a load in interference check processing.

Figure 2:
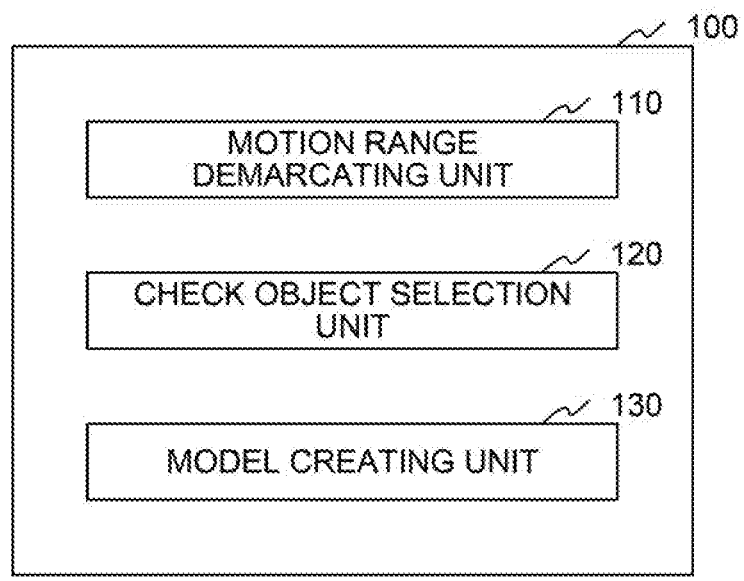
FIG. 2 is a block diagram illustrating a configuration of an information processing device according to a second embodiment.

FIG. 2 is a block diagram illustrating a functional configuration of the information processing device 100. The information processing device 100 includes a motion range demarcating unit 110, a check object selection unit 120, and a model creating unit 130. The information processing device 100 includes a central processing unit (CPU), a storage device, an input/output device, and the like. The processing unit is logically realized by execution of a program, which is stored in the storage device, by the CPU.

The motion range demarcating unit 110 specifies a motion range of a movable unit, that is, an axis and a structure that operates along with the axis of a machine tool or the like by calculation. In this calculation, three-dimensional model data in designing of the machine tool or the like, and data such as an axis travel distance (over travel (OT)) and origin coordinates held as a parameter by the information processing device 100 are used. That is, when three-dimensional model data of the movable unit is moved from the origin coordinates for the axis travel distance in an axis travel direction, an extruded figure that is a trajectory thereof can be defined. The motion range demarcating unit 110 can define a motion range by creating such extruded figures with respect to all movable units and calculating the sum of all the created extruded figures.

Figure 3:
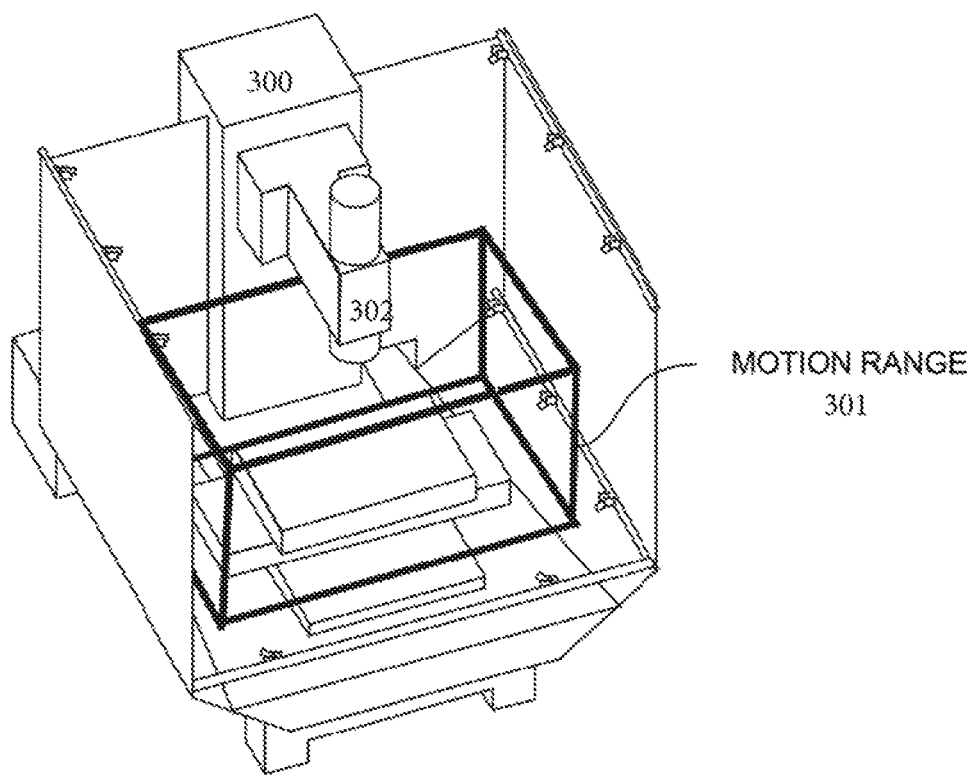
FIG. 3 is a view illustrating a motion range created by a motion range demarcating unit.

The check object selection unit 120 extracts a structure that may cause interference from all structures of the machine tool or the like on the basis of the motion range defined by the motion range demarcating unit 110. As Illustrated in FIG. 3, in an example of the check object selection unit 120, all structures of a machine tool 300 or the like and a motion range 301 of a movable unit 302 of the machine tool or the like which range is specified by the motion range demarcating unit 110 may be displayed on a display device (operation screen of user) (not illustrated), and a structure selected by a user with operation on an input device such as a mouse, keyboard, or touch panel (not illustrated) with reference to the displayed motion range may be extracted as a structure that may interfere with the movable unit of the machine tool or the like (manual extraction). Also, in a different example of the check object selection unit 120, on the basis of three-dimensional model data in designing of a machine tool or the like and a motion range of a movable unit of the machine tool or the like which range is specified by the motion range demarcating unit 110, a structure of the machine tool or the like which structure has an overlapped part with the motion range may be specified and the specified structure may be extracted as a structure that may interfere with the movable unit of the machine tool or the like (automatic extraction). Note that since this automatic extraction (interference check) can be executed by utilization of a known technology, a detailed description thereof is omitted here.

Similarly to the first embodiment, the model creating unit 130 creates three-dimensional model data only including a structure selected by the check object selection unit 120.

In a case where the check object selection unit 120 of the present embodiment supports manual extraction, by a user, of a structure that may cause interference, the user can refer to a motion range of a movable unit of a machine tool or the like, which range is specified by the motion range demarcating unit 110, when selecting a structure determined to possibly interfere with a different structure. Thus, the user can easily select a structure determined to possibly cause interference. Also, in a case where automatic extraction of a structure that may cause interference is performed by the check object selection unit 120 of the present embodiment, it is possible to create, without troubling a user, three-dimensional model data optimized for an interference check by using existing three-dimensional model data created in designing of a machine tool or the like.

Figure 4:
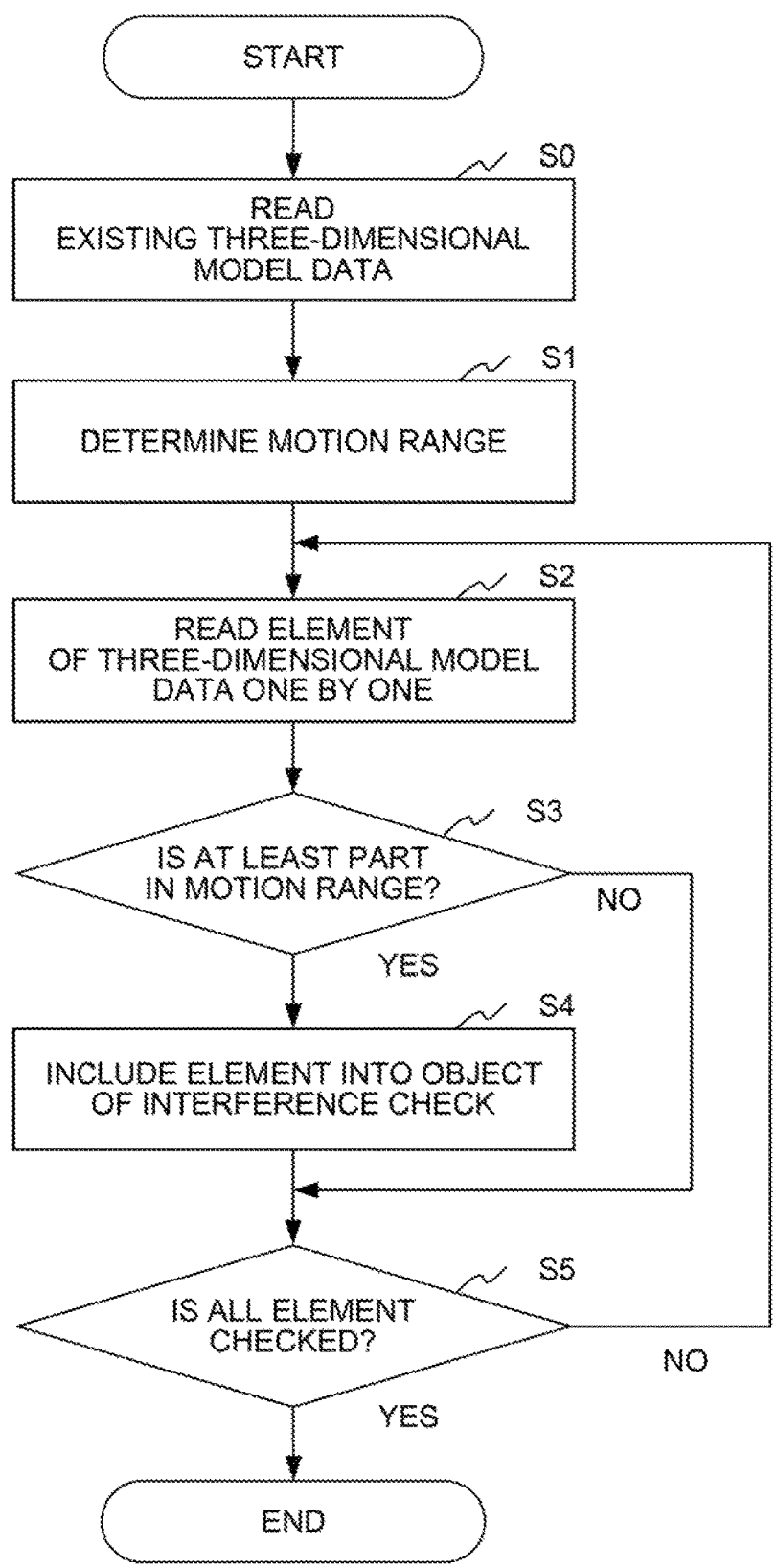
FIG. 4 is a flowchart illustrating a configuration of an information processing device.

Three-dimensional model creating processing (case where automatic extraction of structure that may cause interference is performed) of the information processing device 100 will be described in more detail with reference to the flowchart in FIG. 4.

S0: The check object selection unit 120 reads three-dimensional model data of a machine tool or the like (typically, what is created in designing of machine tool or the like) from a storage region or the like (not illustrated).

S1: The motion range demarcating unit 110 creates a three-dimensional shape indicating a motion range of a movable unit, that is, an axis and a structure that operates along with the axis of the machine tool or the like.

S2: The check object selection unit 120 reads elements of the three-dimensional model data read in S0 (three-dimensional model data of structure such as component) one by one.

S3: The check object selection unit 120 checks whether the three-dimensional model data of the elements read in S2 and the three-dimensional shape of the motion range which shape is created in S1 interfere with each other. In other words, it is checked whether a part or all of the elements are included in the motion range. In a case where a part or all of the elements are included, the processing transitions to S4. In a case where no element is included, the processing transitions to S5.

S4: The check object selection unit 120 selects, as objects of an interference check, the elements read in S2.

S5: When all the elements are checked in S3, the model creating unit 130 creates new three-dimensional model data in which only the elements selected as the objects of the interference check in S4 are elements. Accordingly, three-dimensional model data optimized for interference check processing is completed.

According to each embodiment of the present invention, an information processing device 100 can generate three-dimensional model data only including a structure that may cause interference, that is, three-dimensional model data optimized for an interference check. That is, the information processing device 100 manually or automatically selects an object of the interference check. By execution of such processing before execution of the interference check, it becomes possible to control a processing load in interference check processing.

Also, the information processing device 100 can generate three-dimensional model data optimized for an interference check by using existing three-dimensional model data created in designing of a machine tool or the like. Accordingly, for example, there is no trouble for a user to create new three-dimensional model data by himself/herself, and a simple and effective interference check can be realized.

In the above, embodiments of the present invention have been described. However, the present invention is not limited to examples of the above-described embodiments and may be performed in a different mode with an arbitrary change.

The invention claimed is:

1. An information processing device that optimizes, for an interference check, three-dimensional model data of a machine including a plurality of structures, the device comprising:
    a processor configured to:
        execute a motion range demarcating unit that determines a three-dimensional motion range of the machine;
        execute a check object selection unit that selects structures among the plurality of structures in the three-dimensional model data that overlap the determined three-dimensional motion range of the machine; and
        execute a model creating unit that creates a modified three-dimensional model data from the selected structures.

2. The information processing device according to claim 1,
    wherein the check object selection unit performs the selection among the structures on the basis of operation by a user.

3. The information processing device according to claim 2,
    further comprising a motion range demarcating unit that calculates a motion range of a movable unit of the machine,
    wherein the check object selection unit supports the operation by the user by displaying the three-dimensional model data and the motion range on an operation screen of the user.

4. The information processing device according to claim 3,
    wherein the motion range demarcating unit calculates the motion range on the basis of the three-dimensional model data of the structure included in the movable unit, and an axis travel distance.

5. The information processing device according to claim 1,
    further comprising a motion range demarcating unit that calculates a motion range of a movable unit of the machine,
    wherein the check object selection unit automatically selects a structure at least a part of which is included in the motion range.

* * * * *